United States Patent
Rohe et al.

(10) Patent No.: US 9,163,130 B2
(45) Date of Patent: Oct. 20, 2015

(54) METHOD FOR THE PRODUCTION OF ZNS PARTICLES HAVING A METAL OXIDE COATING AND A COBALT CONTENT, PRODUCTS OBTAINED THEREBY, AND USE OF SAID PRODUCTS

(71) Applicant: SACHTLEBEN CHEMIE GMBH, Duisburg (DE)

(72) Inventors: Markus Rohe, Moers (DE); Matthias Kretschmer, Potsdam (DE)

(73) Assignee: SACHTLEBEN CHEMIE GMBH, Duisburg (DE)

( * ) Notice: Subject to any disclaimer, the term of this patent is extended or adjusted under 35 U.S.C. 154(b) by 0 days.

(21) Appl. No.: 14/406,761

(22) PCT Filed: Jun. 5, 2013

(86) PCT No.: PCT/DE2013/100202
§ 371 (c)(1),
(2) Date: Dec. 10, 2014

(87) PCT Pub. No.: WO2013/185753
PCT Pub. Date: Dec. 19, 2013

(65) Prior Publication Data
US 2015/0152240 A1 Jun. 4, 2015

(30) Foreign Application Priority Data
Jun. 12, 2012 (DE) .......................... 10 2012 105 034

(51) Int. Cl.
*C09C 1/04* (2006.01)
*C08K 3/30* (2006.01)
*C04B 14/04* (2006.01)
*C04B 14/30* (2006.01)
*C04B 14/34* (2006.01)
*C08K 3/08* (2006.01)
*C08K 3/22* (2006.01)
*C08K 3/36* (2006.01)
*C08K 7/14* (2006.01)
*C23C 18/32* (2006.01)
*D21H 17/67* (2006.01)
*D21H 17/68* (2006.01)

(52) U.S. Cl.
CPC . *C08K 3/30* (2013.01); *C04B 14/04* (2013.01); *C04B 14/303* (2013.01); *C04B 14/305* (2013.01); *C04B 14/34* (2013.01); *C08K 3/08* (2013.01); *C08K 3/22* (2013.01); *C08K 3/36* (2013.01); *C08K 7/14* (2013.01); *C09C 1/04* (2013.01); *C23C 18/32* (2013.01); *D21H 17/675* (2013.01); *D21H 17/68* (2013.01); *C01P 2004/84* (2013.01); *C08K 2003/0843* (2013.01); *C08K 2003/2227* (2013.01); *C08K 2003/2241* (2013.01); *C08K 2003/3036* (2013.01)

(58) Field of Classification Search
CPC .......... C09C 1/04; C04B 14/04; C04B 14/34; C04B 14/303; C04B 14/305; C08K 3/08; C08K 3/22; C08K 3/30; C08K 3/36; C08K 7/14; C08K 2003/3036; C08K 2003/2241; C08K 2003/0843; C08K 2004/84; C23C 18/32; D21H 17/675; D21H 17/68
USPC .......................................... 106/420; 524/435
See application file for complete search history.

(56) References Cited

U.S. PATENT DOCUMENTS

| | | | |
|---|---|---|---|
| 6,143,400 A | 11/2000 | Schwertfeger et al. | |
| 6,436,183 B1 * | 8/2002 | Amirzadeh et al. | 106/420 |
| 2010/0063164 A1 | 3/2010 | Amirzadeh-Asl et al. | |

FOREIGN PATENT DOCUMENTS

| | | |
|---|---|---|
| AT | 235438 B | 8/1964 |
| CN | 101177551 A | 5/2008 |
| DE | 809838 C | 8/1951 |
| EP | 1380670 A1 | 1/2004 |
| GB | 797845 A1 | 7/1958 |
| JP | 01-284583 A * | 11/1989 |
| JP | H11335823 A | 12/1999 |
| JP | 2005171316 A | 6/2005 |
| WO | 2008065208 A1 | 6/2008 |

OTHER PUBLICATIONS

Machine Translation of Austrian Patent Specification No. AT 235468B (Aug. 25, 1964).*
Machine Translation of Austrian Patent Specification No. AT 235438 B (Aug. 25, 1964).*
International Preliminary Report on Patentability, dated Dec. 24, 2014.
English Abstract of JP2005171316, Jun. 30, 2005.
English Abstract of JPH11335823, Dec. 7, 1999.
English Abstract of WO2008065208, Jun. 5, 2008.

* cited by examiner

*Primary Examiner* — Anthony J Green
(74) *Attorney, Agent, or Firm* — Cahn & Samuels, LLP

(57) ABSTRACT

Co/metal oxide/ZnS composite particles include a ZnS core and a metal oxide coating surrounding the core, the coating having a content of cobalt from 1 to 150 ppm, based on the total weight of the composite particles, wherein the metal oxide is $SiO_2$, $TiO_2$, $Al_2O_3$ or mixtures thereof.

19 Claims, 5 Drawing Sheets a)

b)

c)

MO = SiO$_2$, TiO$_2$ and/or Al$_2$O$_3$

● = Cobalt

| sample | Notch Impact strength 1J pendular [kJ/m²] | Standard deviation | Impact strength 4J pendular [kJ/m²] | Standard deviation |
|---|---|---|---|---|
| [6] | 4,1 | 0,1 | 21,6 | 0,8 |
| [7] | 4,1 | 0,1 | 20,3 | 0,8 |
| [8] | 4,2 | 0,1 | 22 | 0,7 |
| [9] | 4,2 | 0,1 | 21,2 | 0,7 |
| [10] | 4 | 0,1 | 19,4 | 0,6 |
| [11] | 3,4 | 0,1 | 17,6 | 0,3 |
| [12] | 3,8 | 0,1 | 20,6 | 0,7 |

… … …

METHOD FOR THE PRODUCTION OF ZNS PARTICLES HAVING A METAL OXIDE COATING AND A COBALT CONTENT, PRODUCTS OBTAINED THEREBY, AND USE OF SAID PRODUCTS

This U.S. patent application is a national stage application of PCT/DE2013/100202 filed on 5 Jun. 2013 and claims priority of German patent document DE 10 2012 105 034.1 filed on 12 Jun. 2012, the entireties of which are incorporated herein by reference.

BACKGROUND OF THE INVENTION

The present invention relates to a method for producing ZnS particles having a coating formed of metal oxide, selected from $SiO_2$, $TiO_2$, $Al_2O_3$ or mixtures thereof with a content of cobalt$^{2+}$, the Co/metal oxide/ZnS composite particles obtained hereby, and use thereof.

Zinc sulphide is a frequently used pigment. It has a low Mohs hardness of approximately 3 and is used in white pigments, for example lithopones, due to its high refractive index (n~2.37); in cadmium pigments, zinc sulphide is used to vary the colour tones. Zinc sulphide doped with copper, silver, manganese or aluminium is used as a phosphor.

In order to avoid the greying of zinc sulphide caused by the influence of light, a cobalt salt is added to zinc sulphide. This greying of the ZnS in the presence of light and water is a photolysis reaction, which takes place at the surface of the zinc sulphide. The separation of elemental zinc leads to this grey colouring of the Co-free zinc sulphide. A doping with cobalt, by contrast, leads to light-fast zinc sulphides. ZnS products from the prior art contain up to 300-350 ppm $Co^{2+}$. In accordance with a long-term effort ordered by the REACH Commission, cobalt-containing compounds must be increasingly substituted by non-toxic compounds. On the basis of the REACH regulations, it will also be necessary to identify separately those cobalt-containing compounds having >250 ppm CoS (=160 ppm $Co^{2+}$).

A series of zinc sulphides treated with $SiO_2$ are known in the prior art. Examples of this prior art include CN101177551, JP2005171316, JP11335823 and EP1380670. The materials disclosed therein however are mixed composites of ZnS and $SiO_2$ or ZnS coated with $SiO_2$.

As is known in the prior art, there is a link between the cobalt concentration in the particle and the light-fastness of the materials. Cobalt contents less than 190 ppm $Co^{2+}$ lead to light-sensitive products.

Accordingly, AT 235438B describes a zinc sulphide pigment that is suspended in an aqueous solution of an alkali salt of the isopoly acids of silicon or phosphorous, and this suspension is flocked with a solution of a mixture of alkaline earth chloride and/or aluminium chloride, and the encased pigment is then filtered off, washed out, dried and ground, wherein a flocking solution is used that additionally contains at least one salt of the metals iron, cobalt, nickel, copper, cadmium, titanium, zirconium and cerium, and of the rare earth metals, especially chlorides or nitrates, in a percentage of at least 0.03% by weight, especially 0.05-0.5% by weight metal, based on the pigment.

No ZnS products having such a reduced cobalt content of less than 190 ppm $Co^{2+}$ with simultaneous resistance to greying are known in the prior art. There is thus a need for greying-resistant zinc sulphide of this type.

The inventors have considered the problem of reducing the cobalt content in zinc sulphide whilst at the same time not affecting the light-fastness disadvantageously. The inventors have found that zinc sulphide must have optimised properties in particular at the surface of the particles, where photolysis occurs, in order to be able to reduce the cobalt content. The inventors have been able to prove that the majority of the cobalt is bonded only at the surface of the ZnS. The inventors have found that cobalt atoms in the interior of a ZnS particle are not responsible for the photostabilisation of the ZnS and that only cobalt atoms at the surface of the particles can contribute to the prevention of greying. Indeed, the mechanism of photolysis and the role of the cobalt have been debated in the prior art, however it is currently assumed that the oxidation levels of cobalt change partially during the photolysis process.

SUMMARY OF THE INVENTION

The inventors have found that a surface modification of zinc sulphide particles with $SiO_2$, $TiO_2$, $Al_2O_3$ or mixtures thereof in combination with a small quantity of cobalt salts, such as cobalt sulphate, leads to photostable zinc sulphides. In this way, cobalt in the form of $Co^{2+}$ with an inorganic post-treatment component, such as $SiO_2$, $TiO_2$ and/or $Al_2O_3$, is fixed firmly to the surface of the particles, such that less cobalt $Co^{2+}$ is therefore required. The method according to the invention is illustrated schematically in three possible embodiments in FIG. 1.

The tests performed by the inventors have shown that a series of method parameters as explained below are to be observed in order to obtain an optimised product. The invention thus relates to a method for producing a Co/metal oxide/ZnS composite, the Co/metal oxide/ZnS composite as such, and the use thereof as a pigment in plastics in order to improve the mechanical and/or optical properties, wherein the metal oxide is selected from $SiO_2$, $TiO_2$, $Al_2O_3$ or mixtures thereof.

Zinc sulphide that is preferably cobalt-free is used as starting material ZnS in order to keep low the total content of cobalt. Here, a powdery solid and also Co-free ZnS filter cake can be used. The used zinc sulphide can be dried or freshly produced zinc sulphide. An exemplary production method is described in WO2008-065208. The particle size of the used ZnS is generally 5 nm to 5 μm, preferably 10 nm to 5 μm, particularly 100 nm to 1 μm.

Based on these ZnS particles, the impregnation with a cobalt salt, preferably cobalt sulphate, cobalt citrate or cobalt oxide, or mixtures thereof, can be implemented in the next step. This embodiment is advantageous, since the cobalt atoms are shielded on the ZnS particles by the metal oxide layer, such as an $SiO_2$ layer, $TiO_2$ layer or $Al_2O_3$ layer. It is also possible to first perform an inorganic post-treatment with the metal oxide precursor, and in the next step to perform an impregnation with the cobalt salt, or to perform the surface treatment with the metal oxide precursor and the cobalt salt simultaneously.

In any case, the quantity of cobalt salt is such that the concentration of $Co^{2+}$ in the end product lies in the range between 1 and 150 ppm, preferably 5 and 120 ppm, and particularly preferably 20 to 100 ppm, in order to attain sufficient UV resistance.

Further, the pH value must be kept in the alkaline range during the surface treatment, which, in the case of use of water glass as $SiO_2$ precursor, does not require any addition of alkalis, such as sodium hydroxide, however this is not excluded.

The inorganic surface treatment is preferably performed prior to a drying of the zinc sulphide used in accordance with the invention. To this end, the zinc sulphide filter cake can be redispersed in aqueous medium and then post-treated by the addition of one or more of the above-mentioned surface-treatment reagents. The surface treatment is performed in accordance with the prior art concerning the inorganic surface treatment of pigments. The subsequent processing is performed as already presented above.

The inorganic surface treatment of the zinc sulphide takes place for example in aqueous suspension. The reaction temperature here preferably should not exceed 60° C. The pH value of the suspension can also be set to pH values in the range greater than 9, for example with use of NaOH.

Under vigorous stirring, the surface-treatment chemicals (inorganic compounds), preferably water-soluble inorganic compounds or salts of a metal, such as silicon, titanium or aluminium, and/or cobalt are then added. The pH value and the quantities of surface-treatment chemicals are selected in accordance with the invention such that the latter are present fully dissolved in water.

The ZnS suspension is stirred intensively, such that the surface-treatment chemicals are distributed homogeneously in the suspension, preferably for at least 5 minutes. In the next step, the pH value of the suspension is lowered. Here, it has proven to be advantageous to lower the pH value slowly and under vigorous stirring. The pH value is particularly preferably lowered within 10 to 90 minutes to values from 5 to 8, preferably to values around the neutral point in the range from 6.5 to 7.5.

In accordance with the invention, a maturation period of up to 120 minutes, particularly up to 90 minutes, preferably a maturation period of an hour, then follows. The temperatures here preferably should not exceed 60° C. The aqueous suspension is then washed and dried. For example, the surface-modified zinc sulphide according to the invention can be dried by spray drying, freeze drying and/or grinding drying. Depending on the drying method, a subsequent grinding and/or sifting of the dried powder may be necessary. The grinding can be carried out in accordance with methods known per se.

In principle, the inorganic surface treatment of zinc sulphide can be performed in accordance with the invention by a treatment with metal oxide precursor compound(s) in the form of various salts or compounds in aqueous solution.

The inorganic surface modification of the ultra-fine zinc sulphide according to the invention may consist of compounds that contain the following elements: cobalt, silicon, aluminium and titanium compounds and/or salts. Examples include sodium silicate, sodium aluminate, titanyl sulphate and cobalt sulphate.

In order to achieve an improved fixing of the cobalt in the inorganic "sleeve", the surface-treated ZnS is annealed for a period of up to 240 minutes, particularly over 15 to 90 minutes, in a temperature range from 400° C. to 1000° C., particularly 500° to 800° C., under an atmosphere that may be inert. In this way, the oxidic precursor compounds are converted reliably into the oxides, and the Co/metal oxide/ZnS is formed.

The invention thus relates to Co/metal oxide/ZnS composite particles having a ZnS core and a metal oxide coating surrounding the core, said coating having a content of cobalt, wherein the metal oxide is selected from $SiO_2$, $Al_2O_3$, $TiO_2$ or mixtures thereof. Where reference is made in accordance with the invention to a content of cobalt, contents of $Co^{2+}$ are intended.

Such composite particles may have a ZnS core and a metal oxide coating surrounding the core, wherein the core is cobalt-free. When annealing the particles, it is possible for $Co^{2+}$ to diffuse from the metal oxide coating having a content of cobalt into the core layers arranged beneath the layer, the core however thus remains substantially cobalt-free.

Here, the composite particles have a content of cobalt from 1 to 150 ppm, based on the total weight of the composite particles, and the metal oxide coating can be provided in a mass from 0.1 to 10% by weight, particularly 0.5 to 5% by weight metal oxide, based on the total weight of the composite particles.

A metal oxide coating can contain $Al_2O_3$ in a mass from 0.5 to 5% by weight, based on the total weight of the composite particles.

A further metal oxide coating can contain $SiO_2$ in a mass from 0.5 to 3% by weight, particularly 1 to 2.5% by weight, based on the total weight of the composite particles.

Another metal oxide coating may contain $TiO_2$ in a mass from 0.5 to 3% by weight, particularly 1 to 2.5% by weight, based on the total weight of the composite particles.

Here, the composite particles may have particularly a particle size from 10 nm to 5 µm, particularly 100 nm to 1 µm.

The invention also advantageously relates to a method for producing the Co/metal oxide/ZnS composite particles, wherein the metal oxide is selected from $SiO_2$, $Al_2O_3$, $TiO_2$ or mixtures thereof, said method comprising the following steps:

a. applying a $Co^{2+}$-containing layer to ZnS particles by treating the ZnS particles with a solution of a Co salt;
b. adding an alkaline solution of a metal oxide precursor compound, such as sodium silicate, sodium aluminate, titanyl sulphate, or mixtures thereof, wherein the metal is selected from Si, Ti, Al or a plurality thereof,
c. lowering the pH value of the suspension to a range from pH 5 to 8, optionally followed by a maturation period of up to 120 min,
d. calcining the filtered-off and preferably dried particles in a temperature range from 400° to 1000° C., particularly 500° to 1000° C., optionally followed by a grinding and/or sifting of the particles.

The treatment of the ZnS particles with the solution of a Co salt and the addition of the alkaline solution of $SiO_2$, $TiO_2$ and/or $Al_2O_3$ precursor compounds can also be performed in one step. A method according to the invention in which the order of steps a. and b. is swapped is also possible. In any case the ZnS particles can be presented in an aqueous solution or as dry powder. Compounds that produce a metal oxide or mixtures thereof following the calcination are referred to as metal oxide precursor compounds. Examples include alkali silicates, alkali aluminates, alkali titanates, hydroxides or hydrates thereof, and, depending on the conditions, also aluminium sulphate, which can be used individually or as mixtures.

In the manner according to the invention, different composite materials can be synthesised that have cobalt contents of approximately 20 to 100 ppm compared with 300-350 ppm cobalt as $Co^{2+}$ in ZnS materials according to the prior art The cobalt content is thus merely approximately 5-28% of the cobalt content of the particles in the prior art.

The invention thus also relates to the Co/metal oxide/ZnS composite particles having a ZnS core and a coating surrounding the core, selected from $SiO_2$, $TiO_2$, $Al_2O_3$ or mixtures thereof, said coating having a content of cobalt $Co^{2+}$. Proceeding from a cobalt-free ZnS, the provision of composite particles having a ZnS core and a metal oxide coating surrounding the core is possible, wherein the core is cobalt-free. In this case, a cobalt-free core means that cobalt can diffuse from the outside into the core if need be during the course of the production method, for example as a result of thermal diffusion during annealing, and can be present in an outer layer of a few nm.

In accordance with the invention, the content of cobalt generally lies in a range from 1 to 150 ppm, preferably 5 and 120 ppm, and particularly preferably 20 to 100 ppm, in order to attain sufficient UV resistance, in each case based on the total weight of the composite particles. Here, the MO coating, such as the $SiO_2$ coating, is present in a mass from 0.1 to 10% by weight, based on the total weight of the composite particles, and the particle size of the Co/metal oxide/ZnS composite particles is from 10 nm to 5 µm.

The invention recommends the use of the Co/$SiO_2$/ZnS composite particles as a pigment in moulding compounds, in particular in inorganic and/or organic polymers, in particular in glass-fibre-reinforced plastics and moulded articles fabricated therefrom, and also in paints, dyes, fibres, paper, grouts and sealants, adhesives, ceramics, enamels, adsorbents, ion exchangers, abradants and polishes, cooling lubricants and cooling lubricant concentrates, refractory products, hard concrete materials, medical products and cosmetics, and also for improving the mechanical and/or optical properties of materials, for example the hardness, flexural strength, impact strength and light-fastness of thermoset materials and thermoplastics, or also in thermoset materials, thermoplastics and elastomers for stabilisation with respect to heat.

BRIEF DESCRIPTION OF THE DRAWINGS

The invention will be explained further on the basis of the following examples and figures, in which.

DETAILED DESCRIPTION OF THE INVENTION

Figure 1:
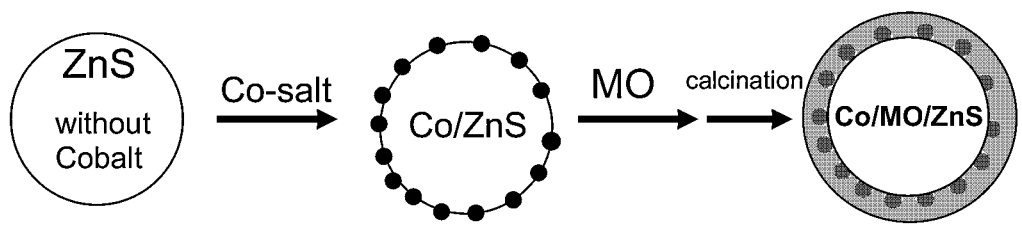
FIG. 1 shows a schematic illustration of the synthesis of surface-modified zinc sulphide.
Figure 1:
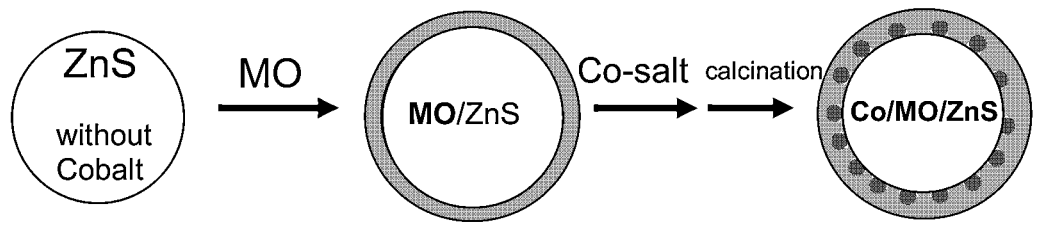
Figure 1:
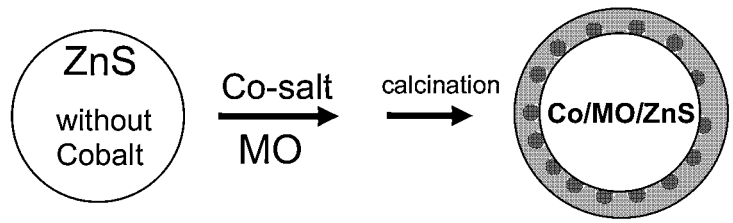

The particles denoted by numbers in the figures are composed as follows, wherein MO stands for $SiO_2$, $TiO_2$, $Al_2O_3$ or mixtures thereof:

[1] ZnS from the prior art (without Co)
[2] ZnS from the prior art (300 ppm Co)
[3] Co/MO/ZnS composite (60 ppm Co)
[4] Co/MO/ZnS composite (26 ppm Co)
[5] MO/ZnS composite (without cobalt)
[6] Polymer PP-GF30
[7] Polymer+$SiO_2$/ZnS composite (1.2% $SiO_2$)
[8] Polymer+$SiO_2$/ZnS composite (6.7% $SiO_2$)
[9] Polymer+$Al_2O_3$/ZnS composite (2.8% $Al_2O_3$)
[10] Polymer+ZnS from the prior art
[11] Polymer+$TiO_2$ (rutile R 620 K)
[12] Polymer+$TiO_2$ (rutile RDDI)
[13] Co/$TiO_2$/ZnS composite (0.5% $TiO_2$, 60 ppm Co)
[14] Co/$TiO_2$/ZnS composite (1% $TiO_2$, 60 ppm Co)
[15] Compound produced in accordance with the method in AT235438B with 900 ppm Co
[16] Compound produced in accordance with the method in AT235438B, but with 290 ppm Co Co/$SiO_2$/ZnS Composites Co/$SiO_2$/ZnS composites were synthesised similarly to the schema in FIG. 1. To this end, Co/$SiO_2$/ZnS composites were produced starting from two ZnS main bodies. On the one hand, Co-free ZnS powder was dispersed by means of dissolver, and on the other hand Co-free ZnS filter cake from the precipitation was used. Following intensive dispersion of the starting materials in water, either cobalt sulphate and/or water glass was/were initially added to the suspension. After 30 minutes, if a mixture had not been used, the other component accordingly was added dropwise to the solution. Following reduction of the pH value to 6.5 by means of addition of aqueous sulphuric acid, the suspension was stirred for 1 hour and the solid was then filtered off and washed. Following drying in a drying cabinet at 110° C. for 12 hours, the powder obtained was ground by means of IKA mill. Some of the material was annealed at 620° C.

The composites obtained were characterised by colorimetric values, relative scattering power and chemical analysis of $Al_2O_3$, $SiO_2$, $TiO_2$, sodium and cobalt. Furthermore, REM and TEM images of the samples were recorded and powder diffractograms were created.

The samples were tested in terms of accelerated weathering, light-fastness, impact strength and abrasiveness during use.

Figures 2, 3:
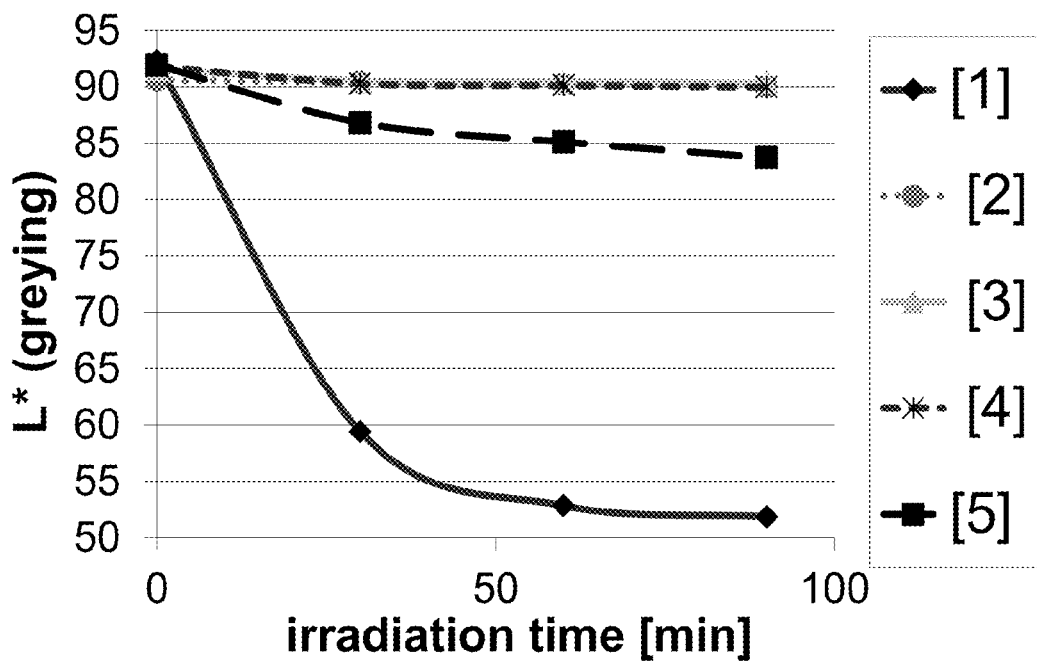
FIG. 2 shows the light-fastness of various zinc sulphides.
FIG. 3 shows the impact strength of composites synthesised with use of particles according to the invention compared with composites synthesised with use of products from the prior art.

As shown in FIG. 2, the composite particles according to the invention have very good light-fastness compared with the materials from the prior art, in spite of a significantly reduced cobalt content.

Practical Examples

One area of application of the products according to the invention is the use in glass-fibre-reinforced plastics. Abrasiveness tests and impact strength tests were therefore performed with different composite materials. Two $SiO_2$/ZnS composites that passed through different pH value levels during the synthesis and an $Al_2O_3$/ZnS composite were tested. The results are shown in the table according to FIG. 3. As shown, no negative influence on the glass fibres caused by the $SiO_2$ surface modification can be determined in glass-fibre-reinforced polypropylene.

Figure 4:
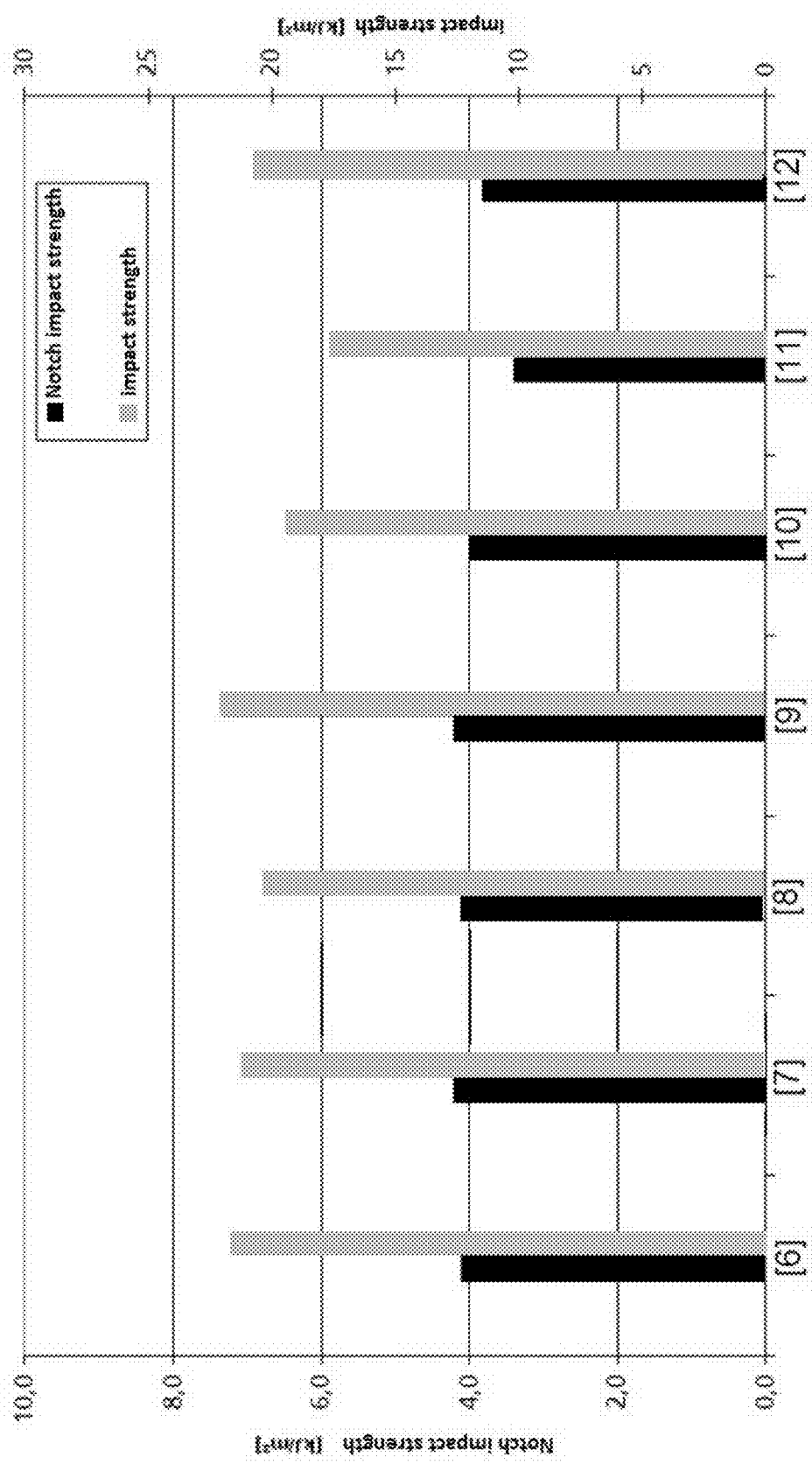
FIG. 4 shows the impact strength (light) and notch impact strength (dark) of ZnS composites and comparison samples.
Figure 5:
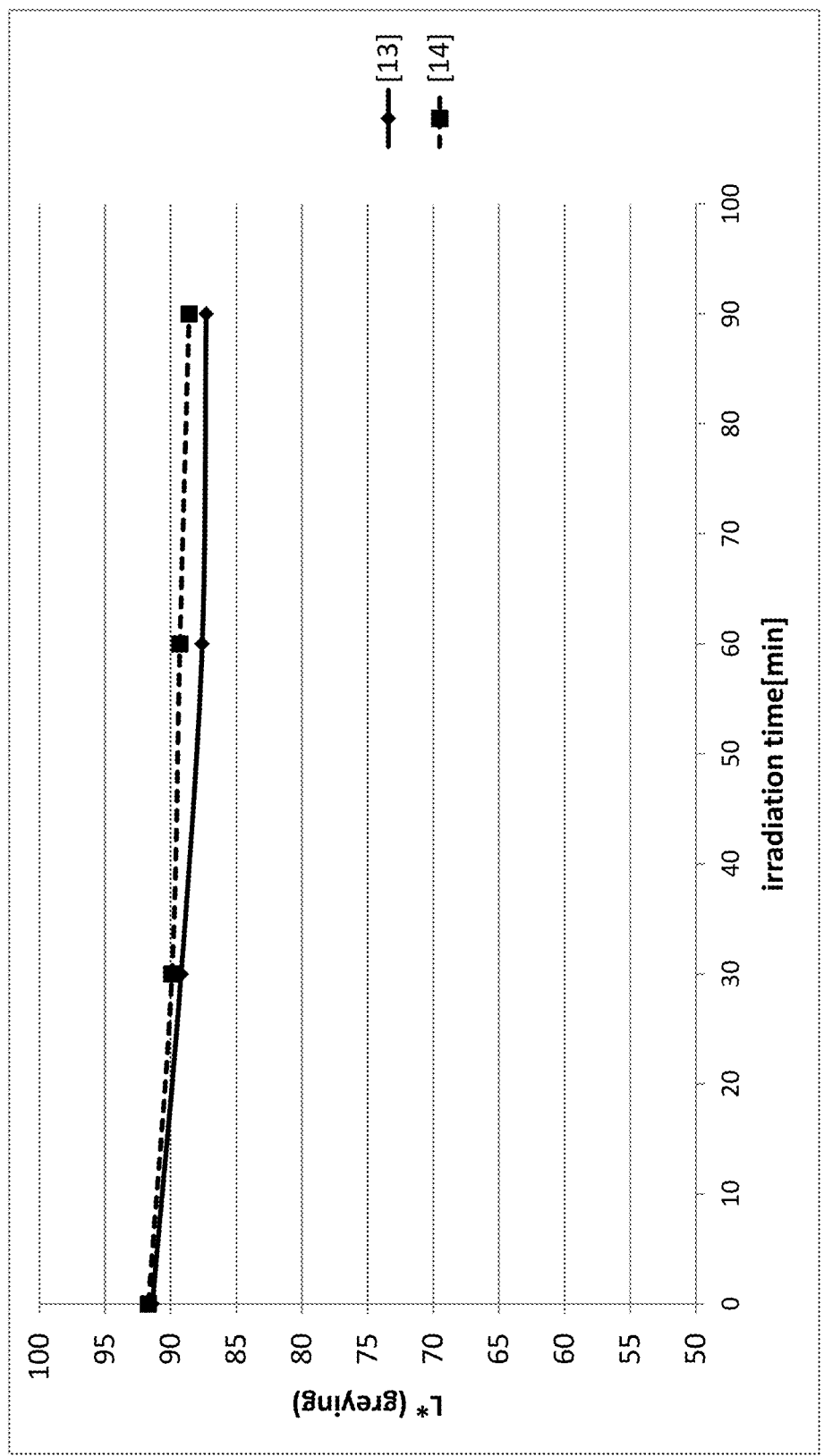
FIG. 5 shows the light-fastness of Co/$TiO_2$/composites.
Figure 6:
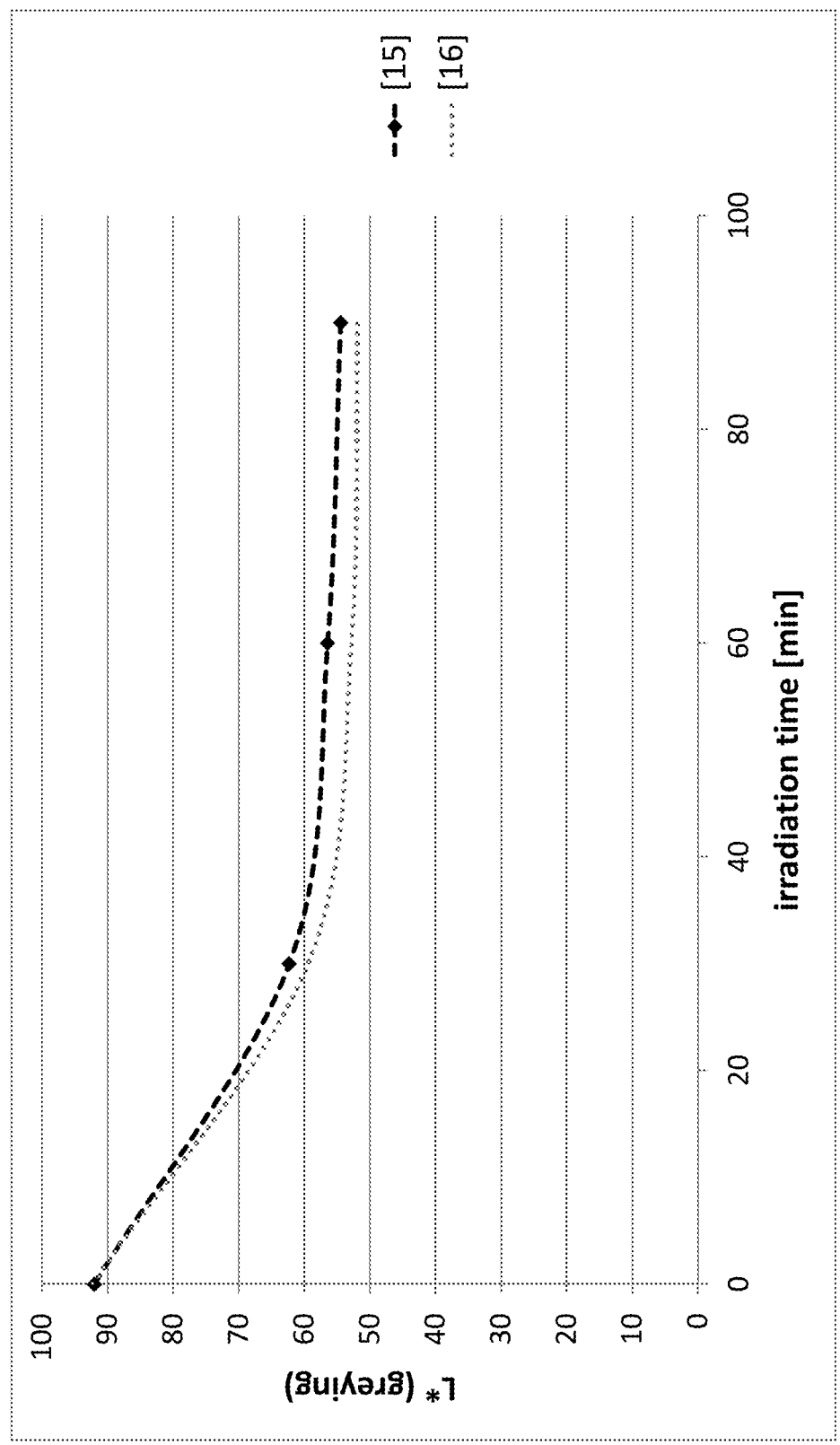
FIG. 6 shows comparative tests concerning the light-fastness of compounds produced in accordance with AT 235438B.

The impact strengths move to the level of unpigmented comparison sample PP-GF30 and the Sachtolith HD-S, as shown in FIG. 4.

With the Co/SiO2/ZnS composites according to the invention, the weathering and the photolysis test show that the materials containing less cobalt (<100 ppm) are light-stable. SiO2/ZnS and Co/ZnS composites by contrast turn grey to a very considerable extent in part. The tests show that cobalt at the surface of the ZnS is crucial and that it is necessary for the cobalt to be incorporated into the ZnS crystal lattice as a result of the annealing process. The colorimetry (relative scattering power, Lab) is such that the composites demonstrate values comparable with the materials from the prior art.

The invention claimed is:

1. Co/metal oxide/ZnS composite particles, comprising:
   a ZnS core; and
   a metal oxide coating surrounding the core, said coating having a content of cobalt from 1 to 150 ppm, based on the total weight of the composite particles, wherein the metal oxide is selected from the group consisting of $SiO_2$, $TiO_2$, $Al_2O_3$ and mixtures thereof.

2. The composite particles according to claim 1, having a ZnS core and the metal oxide coating surrounding the core, wherein the core is cobalt-free.

3. The composite particles according to claim 1, having a content of cobalt from 5 to 120 ppm, based on the total weight of the composite particles.

4. The composite particles according to claim 1, having the metal oxide coating in a mass from 0.1 to 10% by weight metal oxide, based on the total weight of the composite particles.

5. The composite particles according to claim 4, having the metal oxide coating in a mass from 0.5 to 5% by weight $Al_2O_3$, based on the total weight of the composite particles.

6. The composite particles according to claim 4, having the metal oxide coating in a mass from 0.5 to 3% by weight $SiO_2$, based on the total weight of the composite particles.

7. The composite particles according to claim 4, having the metal oxide coating in a mass from 0.5 to 3% by weight TiO2, based on the total weight of the composite particles.

8. The composite particles according to claim 1, having a particle size from 10 nm to 5 μm.

9. A glass-fibre-reinforced plastics material comprising Co/metal oxide/ZnS composite particles according to claim 1.

10. A moulding compound comprising a pigment comprising the Co/metal oxide/ZnS composite particles according to claim 1, wherein said moulding compound comprises inorganic and/or organic polymers.

11. A thermoset or thermoplastic material comprising the Co/metal oxide/ZnS composite particles according to claim 1.

12. An elastomer comprising the Co/metal oxide/ZnS composite particles according to claim 1.

13. A pigment comprising the Co/metal oxide/ZnS composite particles according to claim 1.

14. A product comprising a pigment according to claim 13, wherein said product comprises lithopones, paints, dyes, fibres, paper, grouts and sealants, adhesives, ceramics, enamels, adsorbents, ion exchangers, abradants and polishes, cooling lubricants and cooling lubricant concentrates, refractory products, hard concrete materials, medical products, or cosmetics.

15. A method for producing the Co/metal oxide/ZnS composite particles according to claim 1, said method comprising the following steps:
  a. applying a $Co^{2+}$-containing layer to ZnS particles by treating the ZnS particles in a suspension with a solution of a Co salt;
  b. adding an alkaline solution of a metal oxide precursor compound or mixtures thereof to the suspension,
  c. lowering the pH value of the suspension to a range from pH 5 to 8, optionally followed by a maturation period of up to 120 min,
  d. filtering the suspension to obtain the composite particles,
  e. calcining the filtered composite particles in a temperature range from 400° to 1000° C., optionally followed by a grinding and/or sifting of the filtered composite particles.

16. The method according to claim 15, in which the treatment of the ZnS particles with the solution of a Co salt and the addition of the alkaline solution of metal oxide precursor compounds are performed in one step.

17. The method according to claim 15, in which the order of steps a. and b. is swapped.

18. The method according to claim 15, in which the ZnS particles are in the form of an aqueous solution or a dry powder.

19. The method according to claim 15, further comprising drying the filtered composite particles.

* * * * *